US011446763B2

(12) United States Patent
Luedi et al.

(10) Patent No.: US 11,446,763 B2
(45) Date of Patent: Sep. 20, 2022

(54) NOZZLE STATE OR TYPE IDENTIFICATION IN A METAL MACHINING APPARATUS

(71) Applicant: Bystronic Laser AG, Niederönz (CH)

(72) Inventors: Andreas Luedi, Burgdorf (CH); Christoph Fahmi, Oberoenz (CH); Kevin Messer, Bruegg (CH)

(73) Assignee: BYSTRONIC LASER AG, Niederönz (CH)

( * ) Notice: Subject to any disclaimer, the term of this patent is extended or adjusted under 35 U.S.C. 154(b) by 0 days.

(21) Appl. No.: 17/415,913

(22) PCT Filed: Dec. 18, 2019

(86) PCT No.: PCT/EP2019/085963
§ 371 (c)(1),
(2) Date: Jun. 18, 2021

(87) PCT Pub. No.: WO2020/127492
PCT Pub. Date: Jun. 25, 2020

(65) Prior Publication Data
US 2022/0040789 A1  Feb. 10, 2022

(30) Foreign Application Priority Data
Dec. 19, 2018 (DE) .......................... 102018132795.1
Mar. 29, 2019 (DE) .......................... 102019108172.6

(51) Int. Cl.
*G06K 9/62* (2022.01)
*B23K 26/14* (2014.01)
(Continued)

(52) U.S. Cl.
CPC .......... *B23K 26/1494* (2013.01); *B23K 26/38* (2013.01); *G06T 7/0002* (2013.01); *G06T 2207/20084* (2013.01)

(58) Field of Classification Search
CPC .. B23K 26/1494; B23K 26/38; B23K 26/702; B23K 31/006; G06T 7/0002; G06T 2207/20084
See application file for complete search history.

(56) References Cited

U.S. PATENT DOCUMENTS

2012/0074110 A1* 3/2012 Zediker .................. E21B 10/60
219/121.72
2017/0032281 A1* 2/2017 Hsu ........................ H04L 67/10

FOREIGN PATENT DOCUMENTS

CN  1847732 A  * 10/2006
CN  102137733 A  *  7/2011  ........... B23K 26/042
(Continued)

OTHER PUBLICATIONS

Google scholar search history.*
(Continued)

*Primary Examiner* — Xin Jia
(74) *Attorney, Agent, or Firm* — Jacob Eisenberg

(57) ABSTRACT

The present disclosure relates to a metal machining apparatus having a gas nozzle for generating a gas jet. The apparatus also has a nozzle exit opening on one end on the outside; an electronic camera for acquiring a digital image of the end of the gas nozzle with the nozzle exit opening. The apparatus also includes a pattern recognition module for mapping the digital image to at least one nozzle pattern from the group of nozzle state and/or nozzle type.

15 Claims, 4 Drawing Sheets

(51) Int. Cl.
*B23K 26/38* (2014.01)
*G06T 7/00* (2017.01)

(56) References Cited

FOREIGN PATENT DOCUMENTS

| | | | |
|---|---|---|---|
| CN | 104325218 B * | 2/2016 | ......... B23K 26/0823 |
| DE | 102013214174 B3 | 1/2015 | |
| DE | 102014212632 A1 | 1/2016 | |
| EP | 1600247 A2 | 11/2005 | |
| FR | 2911081 A1 | 7/2008 | |

OTHER PUBLICATIONS

FR 2911081A1 English Language Translation.
DE 102014212682 A1 English language Translation.
DE 102013214174 B3 English Language Translation.

* cited by examiner

NOZZLE STATE OR TYPE IDENTIFICATION IN A METAL MACHINING APPARATUS

CROSS REFERENCE TO RELATED APPLICATIONS

This application is a national phase application of International Application No. PCT/EP2019/085963, filed on Dec. 18, 2019, and claims the priority benefit of German Applications 10 2018 132 795.1, filed on Dec. 19 2018 and 10 2019 108 172.6 filed Mar. 29, 2019, the content of all of the aforementioned being incorporated herein by reference.

BACKGROUND OF THE INVENTION

The present disclosure relates to a machining apparatus, in particular a cutting machine for metals, with automatic detection of a nozzle state and/or a nozzle type and a method for detecting a nozzle state and/or a nozzle type.

In cutting systems, in particular flatbed cutting systems, the workpiece is machined with a laser beam and a gas jet. Gas dynamics play an important role, which is why the gas nozzle is a critical element. Depending on the machining and thickness and type of the workpiece, different gas nozzles are used. Since the gas nozzle is close to the machining process during cutting, it is subject to great wear. Therefore, the gas nozzle state is checked at regular intervals and replaced depending on wear. Cutting with a wrong nozzle type or with a worn gas nozzle will result in significantly reduced cutting quality.

On most of today's systems, the operators themselves have to check and see if and when the gas nozzle needs to be replaced. Such a check is labour intensive and time consuming. Furthermore, it is often recognised too late when the gas nozzle must be replaced, namely only after material has already been cut in a non-optimal way. In addition, it is also possible that operators prophylactically replace the gas nozzle too early, even though it is still usable. This approach is technically inefficient.

BRIEF SUMMARY OF THE INVENTION

It is an object of the present disclosure to maintain the optimum cutting quality and to avoid faulty cutting processes.

According to a first aspect, this object is achieved by a machining apparatus, in particular a metal-cutting device preferably a laser metal-cutting machine, with a gas nozzle for generating a gas jet having a nozzle exit opening at one end on the outside; an electronic camera for acquiring a digital image of the end of the gas nozzle with the nozzle exit opening; and a pattern recognition module for mapping the digital image to at least one nozzle pattern from the nozzle state and/or nozzle type group. Outside means on the outside of the gas nozzle. The gas flows inside the gas nozzle and passes through the nozzle exit opening to the outside into the environment. With automatic nozzle state detection, disadvantages of late replacement of the gas nozzle can be eliminated. The machine becomes more autonomous and reliable. The cutting quality can be easily maintained and faulty cutting processes due to worn gas nozzles can be prevented.

Detecting the nozzle type, for example, achieves the technical advantage that the gas nozzle can be replaced by another gas nozzle of the same type and mix-ups can be avoided. In the case of a manual change by an operator or an automatic nozzle changer, the nozzle type detection can prevent a wrong nozzle type from being used. Differences in the type of the gas nozzle arise owing to the size of the nozzle opening and different types of high and low pressure cutting.

In a technically advantageous embodiment of the machining apparatus, the machining apparatus comprises a lighting device for illuminating the nozzle exit opening during the recording of the digital image. This results in the technical advantage, for example, that the image quality and the accuracy of nozzle state detection are improved. In addition, the disturbing influence of uncontrollable extraneous light, which may vary depending on the customer, is reduced.

In a further technically advantageous embodiment of the machining apparatus, the lighting device comprises multiple light sources for illuminating the nozzle exit opening from multiple directions. This results in the technical advantage, for example, that the gas nozzle can be selectively illuminated from different directions.

In a further technically advantageous embodiment of the machining apparatus, the light sources are arranged uniformly around the nozzle exit opening. This results in the technical advantage, for example, that images are obtained with comparable lighting conditions.

In a further technically advantageous embodiment of the machining apparatus, the light sources are individually controllable. This results in the technical advantage, for example, that the gas nozzle can be selectively illuminated by one or more light sources.

In a further technically advantageous embodiment of the machining apparatus, the light sources are designed to emit light of a predetermined wavelength. This results in the technical advantage, for example, that discolourations of the gas nozzle are detected in a simple manner.

In a further technically advantageous embodiment of the machining apparatus, the electronic camera is designed to detect the digital image in a predetermined wavelength range. This results in the technical advantage, for example, that disturbing ambient light can be suppressed.

In a further technically advantageous embodiment of the machining apparatus, the pattern recognition module is designed to indicate the nozzle state in two or more different degrees. This results in the technical advantage, for example, that the gas nozzle can be replaced in time depending on the requirements of the cutting quality.

In a further technically advantageous embodiment of the machining apparatus, the pattern recognition module comprises a trained neural network or a deep learning algorithm. This results in the technical advantage, for example, that the nozzle pattern can be classified quickly.

In a further technically advantageous embodiment of the machining apparatus, the machining apparatus comprises a user interface for manually entering the nozzle state. This results in the technical advantage, for example, that the pattern recognition module can be trained on the basis of further data and improves the nozzle state detection.

In a further technically advantageous embodiment of the machining apparatus, the machining apparatus can be networked with a cloud or other central computer outside the machining apparatus. For this purpose, the machining apparatus may comprise a communication interface, via which a data connection with the cloud or another central computer can be established. This results in the technical advantage, for example, that measurement data can be written back to a central computer (via IoT kit) in order to further optimise pattern recognition therewith. It is furthermore advantageous that data can be collected from multiple machining apparatuses and more extensive data can be analysed so that additionally optimised pattern recognition is achieved. Optionally, an individual optimised pattern recognition for each machining apparatus can be provided. Furthermore, with the networked embodiment of the machining apparatus, the functionality of the machining apparatus can be continuously monitored so that better maintenance and lower failures of the device can be realized. With the networked embodiment of the machining apparatus, the software of the machining apparatus can always be kept up to date.

In a further technically advantageous embodiment of the machining apparatus, the machining apparatus is a flatbed cutting machine or a cutting device. This results in the technical advantage, for example, that the nozzle state detection is used in a particularly suitable machining apparatus.

According to a second aspect, this object is achieved by a method for detecting a state of wear of a gas nozzle, comprising the steps of acquiring a digital image of the end of a gas nozzle with a nozzle exit opening; and mapping the digital image to at least one nozzle pattern from the nozzle state and/or nozzle type group using a pattern recognition module. By the method, the same technical advantages are achieved as with the machining apparatus according to the first aspect. In this case, it may be advantageous to pre-process the images by means of image processing (feature extraction).

In a technically advantageous embodiment of the method, the nozzle exit opening is illuminated during the recording of the digital image. This likewise results in the technical advantage, for example, that image quality and the accuracy of nozzle state detection are improved.

In a further technically advantageous embodiment of the method, the light sources are individually controlled. This likewise results in the technical advantage, for example, that the gas nozzle can be selectively illuminated by one or more light sources.

In a further technically advantageous embodiment of the method, the light sources emit light of a predetermined wavelength. This likewise results in the technical advantage, for example, that discolourations of the gas nozzle can be easily detected.

In a further technically advantageous embodiment of the method, the nozzle state is input via a user interface. This likewise results in the technical advantage, for example, that the pattern recognition module can be trained on the basis of further data and improves nozzle state detection. This allows the algorithm to continue learning.

BRIEF DESCRIPTION OF THE SEVERAL VIEWS OF THE DRAWINGS

Further advantages features and details of the various embodiments of this disclosure will become apparent from the ensuing description of a preferred exemplary embodiment and with the aid of the drawings. The features and combinations of features recited below in the description, as well as the features and feature combination shown after that in the drawing description or in the drawings alone, may be used not only in the particular combination recited, but also in other combinations on their own, with departing from the scope of the disclosure.

Exemplary embodiments of the invention are illustrated in the drawings and will be described in more detail below.

In the figures:

FIG. 1 depicts a view of a machining apparatus with a gas nozzle;

FIG. 2 depicts different images of a gas nozzle;

FIG. 3 depicts a schematic view of a detection of a nozzle state; and

FIG. 4 depicts a block diagram of a method for detecting a nozzle state.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including only one of A, only one of B, only one of C, or any combination of A, B, and C.

Figure 1:
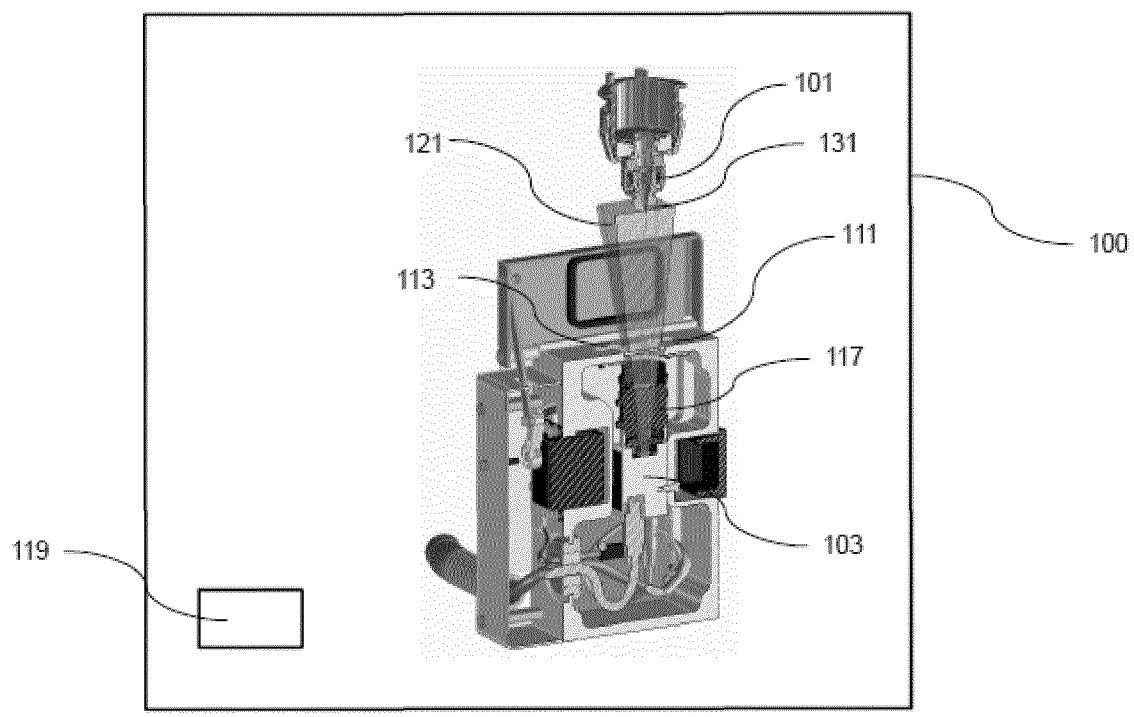

FIG. 1 depicts a view of a gas nozzle 101 above a machining apparatus 100. The machining apparatus 100 serves as a machining apparatus for cutting metal, such as in a flatbed cutting machine or as a cutting machine for metal sheets and/or pipes. The machining apparatus 100 is preferably a laser cutting machine for metal sheets and/or pipes. The machining apparatus 100 is equipped with a nozzle or gas nozzle 101. The gas nozzle 101 has a nozzle exit opening 131, from which cutting gas can flow and further, in case of the preferred laser cutting machine, where a laser beam passes through in the working condition of the machine.

An electronic camera 103 will be used hereinafter to identify the type and severity or degree of wear of the gas nozzle 101. For this purpose, the machining apparatus 100 of a nozzle centring station can be used, which can check or measure the centring of the laser beam to the centre of the nozzle exit opening 131 by means of an electronic camera 103 and multiple illumination. In this case, the cutting head of the flatbed cutting machine moves over the machining apparatus 100, so that the gas nozzle 101 comes to rest above the camera 103. The camera 103 then views the gas nozzle 101 with the nozzle exit opening 131 from below. The lighting, which are also incident from below, makes it easy to see the edges of the nozzle. The gas nozzle 101 is located centrally in the field of view 121 of the camera 103.

The electronic camera 105 is arranged so as to receive a digital image of the gas nozzle 101 from below. Below that means from the side where the gas jet exits the gas nozzle 101. The camera 103 and a lens 117 are disposed directly below the gas nozzle 101. During recording, the nozzle exit opening 131 of the gas nozzle 101 is illuminated from different sides by means of a lighting device 111. The illumination by multiple light sources 113, which can optionally be switched on from different sides, causes the examined nozzle exit opening 131 to look different on the images and generates a different shadow.

For this purpose, the lighting device 111 may for example have four light sources 113, which are arranged uniformly in relation to the nozzle exit opening 131 and illuminate it from different directions. If images are selected with only one light source 113 switched on, this results in four images of the nozzle exit opening 131 from different directions.

A control device (controller) can optimise the image by means of different filters so that the light sources 113 emit light of a predetermined wavelength or are recorded by the camera 103. The light sources 113 can also be light-emitting diodes, for example.

Figure 2:
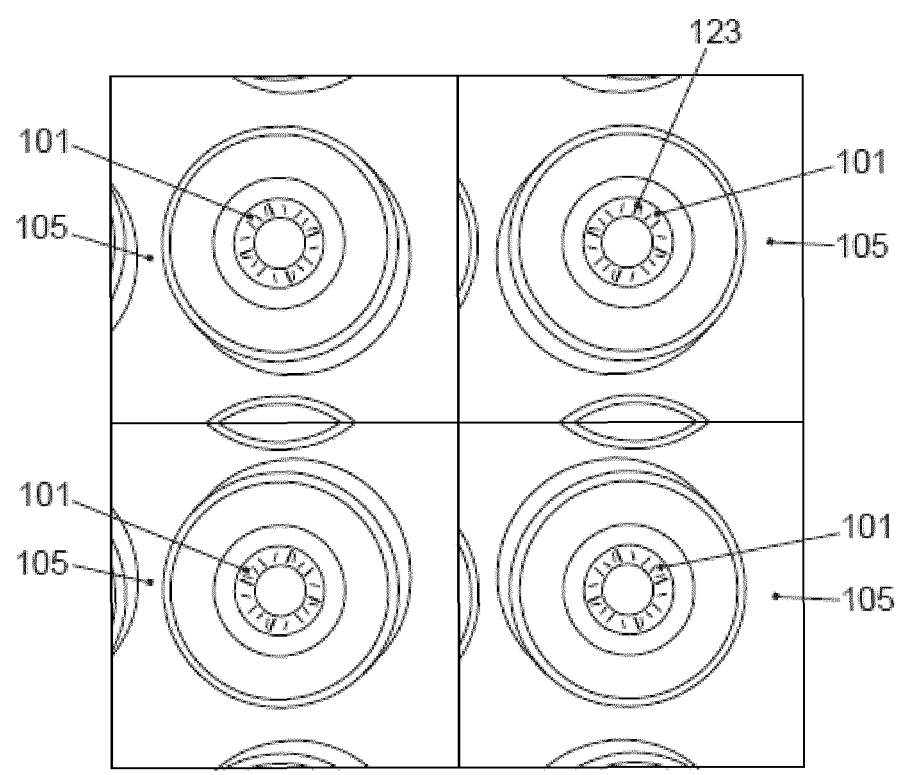

FIG. 2 depicts different images 105 of the nozzle exit opening 131 of the gas nozzle 101, which were illuminated from different directions. The images 105 show the nozzle exit opening 131 of the gas nozzle 101 in a bottom view in the centre of the gas nozzle 101. The tip of the gas nozzle 101 has damage 123.

Each of the images 105 was taken with different lighting. For each image 105, only one of the four light sources 113 has been switched on. If additional images 105 with multiple, i.e. two, three or four, light sources 113 switched on at the same time are added, another eleven images 105 of the gas nozzle 101 are added. This increases the database, increasing the accuracy of nozzle state detection. In general, the number and arrangement of the light sources 113 may vary.

This helps an algorithm to obtain spatial information relating to the gas nozzle 101. The captured images 105 with the different illuminations are finally fed to an algorithm as a pattern recognition module 115 for the purpose of detecting the nozzle type and the nozzle state. For this purpose, the machining apparatus 100 comprises, for example, a microcontroller for executing the algorithm.

Figure 3:
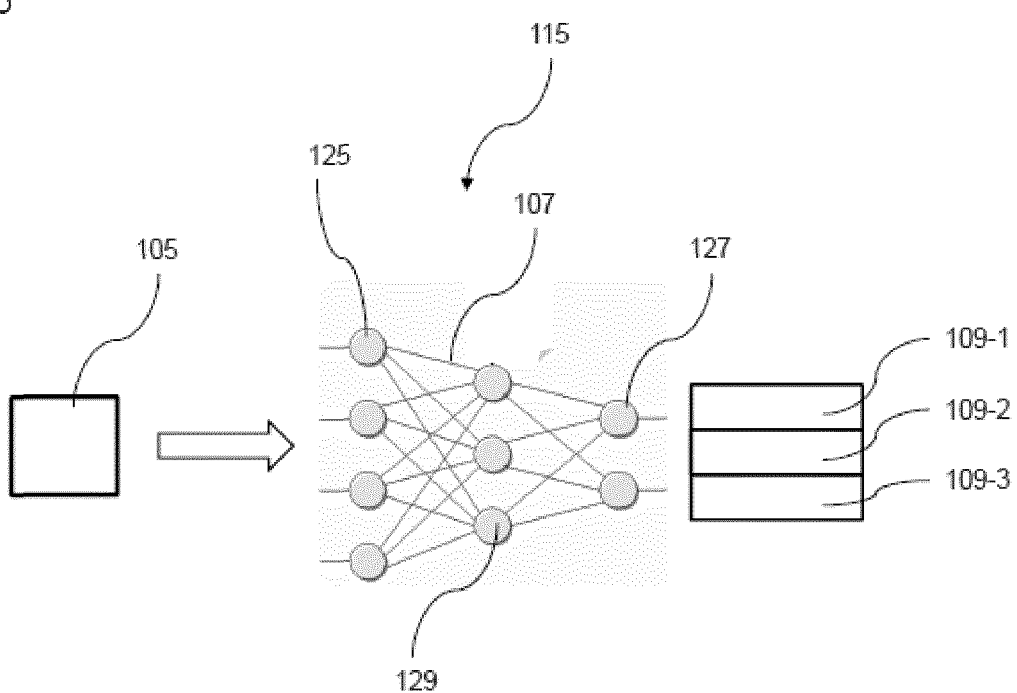

FIG. 3 depicts a schematic view of detection of a nozzle state by means of a trained neural network 107, which is used as a pattern recognition module 115. The neural network 107 is formed by a software or hardware module. In general, however, other pattern recognition modules 115 may also be used.

The neural network 107 comprises a set of machining units linked to each other via communication links, i.e., the neurons 129. The neural network 107 comprises an input layer 125 and an output layer 127. In between there is an arbitrary number of machining layers. The data are in each case further propagated from one layer to the next layer. On each communication link between the neurons 129, the data are weighted differently.

The digital images 105 obtained by the camera 103 with different illumination of the gas nozzle 101 are used as input data into the input layer 125 of the neural network 107. Alternatively, the data obtained by means of a feature extraction (feature extraction) can also be transferred to the input layer 125. Depending on the input images 105, the nozzle state or the nozzle type of the gas nozzle 101 shown on the image 105 is obtained at the output layer 127 of the trained neural network 107. With one and the same image 105, both the nozzle type and the nozzle state can be determined. The neural network 107 can determine only the nozzle type or only the nozzle state from a single image 105.

In order for the neural network 107 to detect the nozzle state 109-1, 109-2 or 109-3 or the nozzle type of the gas nozzle 101, the neural network 107 is initially trained and taught on the basis of existing image data of used and unused gas nozzles 101. In this case, the weights between the individual neurons 129 and the weights of the neurons themselves 129 are set. The respective type and the degree of wear of the gas nozzle 101 are known to the neural network 107 during training. After successful training, the algorithm can automatically detect the degree of wear according to the trained criteria and degrees as well as the nozzle type. The gas nozzles from which the training data originate have previously been assessed and classified by a cutting expert.

By the neural network 107, the nozzle state 109-1, 109-2 and 109-3 can be easily and quickly determined and the reliability of state detection can be improved. The gas nozzle 101 can be classified by means of the neural network 107, for example, on the basis of the following criteria:

Nozzle type of the gas nozzle
Roundness of the nozzle opening
Roundness of the edge to the nozzle opening (countersink of the opening has an effect on cutting behaviour)
Adherent particles/splashes
Discolouration/oxidation
Wear (brush-cleaning cycles)
Collision dents, other destructions/deformations
Insertions Each of these wear criteria may be evaluated, for example, in three degrees 109-1, 109-2, and 109-3, such as 109-1: "Damaged/replace"; 109-2: "Okay for non-critical application"; and 109-3: "Okay for all applications/good). Alternatively, a dynamic or continuous value may be used, such as a value between zero and one.

In general, however, other criteria and a different number of nozzle states 109-1, 109-2 and 109-3 may be used. In general, for nozzle state detection, an intelligent algorithm, artificial intelligence, neural network, or deep learning algorithm can be used.

Figure 4:
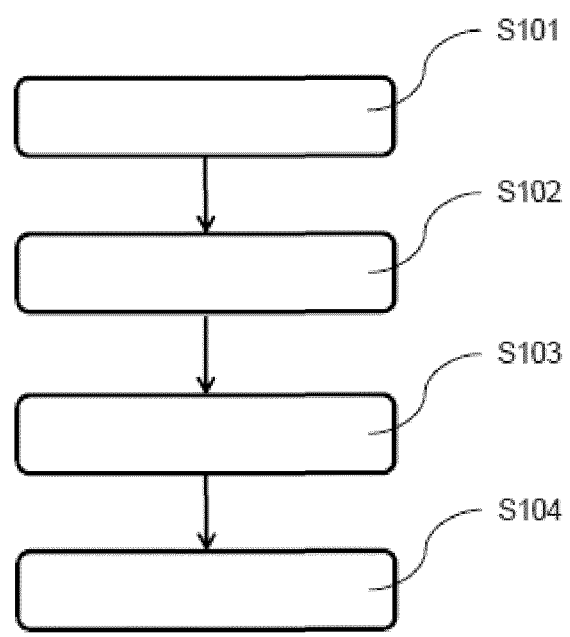

FIG. 4 depicts a block diagram of a method for detecting a nozzle state of the gas nozzle 101 in the machining apparatus 100. The method comprises the step S101 of acquiring the digital image 105 of the end of the gas nozzle 101 with the nozzle exit opening 131. This can be done, for example, by means of the electronic camera 103, which is arranged so that it receives the tip of the gas nozzle 101 vertically from below. The electronic camera 103 generates corresponding digital image data in this way.

Thereafter, in an optional step S102, certain features may be extracted by an algorithm, such as a centre of the nozzle, a diameter of the opening, or filtering of the image data. Through the step S102 as pre-machining, the size of the input layer 125 of the neural network 107 can be reduced.

In step S103, the digital image 105 is mapped by means of the trained neural network 107 as a pattern recognition module 131 to a nozzle pattern from the group comprising the nozzle state 109-1, 109-2, 109-3 and/or the nozzle type.

In step S104, it is automatically decided whether the gas nozzle 101 continues to be used or is ejected. This can be done using a given configuration that determines which nozzle state 109-1, 109-2, 109-3 is good or bad.

Depending on the result of the detection of the nozzle state, it is decided whether the cutting operation is continued or the gas nozzle 101 is replaced. However, it is also possible that the gas nozzle 101 is assessed as to be replaced sooner or later depending on the desired processability. In a robust cutting process, the gas nozzle 101 is used longer than when a tricky cutting process is performed. The implementation into the machine control within the machining apparatus 100 may additionally comprise first positioning the gas nozzle 101 above the camera 103. If it is detected that the gas nozzle 101 can no longer be used, the machine controller may automatically eject the gas nozzle 101.

With the machining apparatus and the method, reliable nozzle state detection can be implemented with little technical effort. In addition, it can be determined whether a correct type of gas nozzle 101 is used. Damaged gas nozzles 101 can be detected in time and automatically replaced. This can ensure that the cutting process is not carried out in a less than optimal manner.

The actual nozzle state 109-1, 109-2, 109-3 may additionally be assessed by a cutting expert and input via the user interface 119. Depending on the application, the wear of the gas nozzle 101 may be assessed differently. A gas nozzle 101, which still seems usable to one customer is already exchanged for another customer. In this way, the neural network 107 can be further trained and learn and consider the customer's judgement. In this way, the neural network 107 can continue learning from a customer.

If the same machining apparatus 100 can be used for the nozzle state detection disclosed herein, as already for existing nozzle centring by means of an electronic camera, the method can be implemented with little effort.

All of the features explained and shown in connection with individual embodiments of the invention can be provided in different combinations in the subject matter according to the invention to simultaneously realise their advantageous effects.

The scope of protection of the present invention is given by the claims and is not limited by the features illustrated in the description or shown in the figures.

The invention claimed is:

1. A machining apparatus for metal, comprising:
a gas nozzle configured for generating a gas jet, the gas nozzle having a nozzle exit opening at one end on an outside of the gas nozzle;
an electronic camera configured for acquiring a digital image of the end of the gas nozzle with the nozzle exit opening;
a pattern recognition module for mapping the digital image onto at least one nozzle pattern from at least one of the nozzle state group and nozzle type; and
wherein the pattern recognition module comprises a trained neural network or a deep learning algorithm and means for detecting the nozzle state and the nozzle type, and
wherein the neural network is initially trained and taught on the basis of existing image data of used and unused gas nozzles, which have previously been assessed and classified by a cutting expert and wherein the weights between individual neurons and weights of the neurons themselves are set, so that after successful training, the algorithm can automatically detect the nozzle state, in particular, a degree of wear according to the trained criteria and degrees as well as the nozzle type.

2. The machining apparatus according to claim 1, wherein the machining apparatus further comprises a lighting device for illuminating the nozzle exit opening during recording of the digital image.

3. The machining apparatus according to claim 2, wherein the illumination device comprises multiple light sources for illuminating the nozzle exit opening from multiple directions.

4. The machining apparatus according to claim 3, wherein the light sources are uniformly arranged around the nozzle exit opening.

5. The machining apparatus according to claim 3, wherein the light sources are individually controllable.

6. The machining apparatus according to claim 3, wherein the light sources are adapted to emit light of a predetermined wavelength.

7. The machining apparatus according to claim 1, wherein the pattern recognition module is configured to indicate the nozzle state in two or more different degrees.

8. The machining apparatus according to claim 1, wherein the machining apparatus further comprises a user interface configured for manually entering the nozzle state.

9. The machining apparatus according to claim 1, wherein the machining apparatus is configured to be networkable with a cloud or other central computer external to the machining apparatus.

10. The machining apparatus according to claim 1, wherein the machining apparatus configured to be a flatbed cutting system or a cutting device.

11. A method for detecting a state of wear of a gas nozzle, the method comprising the steps of:
detecting a digital image of an end of a gas nozzle having a nozzle exit opening;
mapping the digital image to at least one nozzle pattern from at least one of the nozzle state group and nozzle type with a pattern recognition module;
wherein the pattern recognition module comprises a trained neural network or a deep learning algorithm; and
detecting the nozzle state and the nozzle type and wherein the neural network is initially trained and taught on a basis of existing image data of used and unused gas nozzles, which have previously been assessed and classified by a cutting expert and wherein the weights between individual neurons and weights of the neurons themselves are set, so that after successful training, the algorithm can automatically detect at least one of the nozzle state, a degree of wear according to the trained criteria and degrees, and the nozzle type.

12. The method according to claim 11, further comprising the steps of illuminating the nozzle exit opening during acquisition of the digital image.

13. The method according to claim 11, wherein the light sources are individually controlled.

14. The method according to claim 11, wherein the light sources emit light of a predetermined wavelength.

15. The method according to claim 11, wherein the nozzle state is input via a user interface.

* * * * *